(12) United States Patent
Tadros

(10) Patent No.: US 8,859,091 B2
(45) Date of Patent: Oct. 14, 2014

(54) COLORED DIFFUSION SHEETS, METHODS OF MANUFACTURE THEREOF AND ARTICLES COMPRISING THE SAME

(75) Inventor: Safwat E. Tadros, Evansville, IN (US)

(73) Assignee: Sabic Global Technologies B.V. (NL)

( * ) Notice: Subject to any disclaimer, the term of this patent is extended or adjusted under 35 U.S.C. 154(b) by 1325 days.

(21) Appl. No.: 12/274,873

(22) Filed: Nov. 20, 2008

(65) Prior Publication Data

US 2010/0124653 A1  May 20, 2010

(51) Int. Cl.
*B32B 27/20* (2006.01)
*B32B 5/32* (2006.01)
*B32B 27/36* (2006.01)
*B32B 5/20* (2006.01)
*B32B 5/18* (2006.01)
*B32B 3/30* (2006.01)
*G02B 5/02* (2006.01)

(52) U.S. Cl.
CPC . *B32B 5/18* (2013.01); *B32B 27/20* (2013.01); *B32B 27/36* (2013.01); *B32B 5/20* (2013.01); *B32B 5/32* (2013.01); *B32B 3/30* (2013.01); *G02B 5/02* (2013.01)
USPC ............... 428/319.3; 428/319.7; 428/316.6; 428/317.9; 428/315.5; 428/315.7

(58) Field of Classification Search
USPC .......... 428/319.3, 319.7, 316.6, 317.9, 315.5, 428/315.7
See application file for complete search history.

(56) References Cited

U.S. PATENT DOCUMENTS

| | | | |
|---|---|---|---|
| 3,177,109 A | 4/1965 | Ziegler | |
| 3,350,823 A | 11/1967 | Murray | |
| 4,154,785 A | 5/1979 | Inui et al. | |
| 4,244,897 A | 1/1981 | Moon | |
| 4,268,127 A | 5/1981 | Oshima et al. | |
| 4,530,806 A | 7/1985 | Melchior | |
| 4,563,482 A | 1/1986 | Tanizawa et al. | |
| 4,569,950 A | 2/1986 | Hoshi et al. | |

(Continued)

FOREIGN PATENT DOCUMENTS

| | | |
|---|---|---|
| EP | 0175965 A1 | 4/1986 |
| EP | 0494445 B1 | 7/1992 |

(Continued)

OTHER PUBLICATIONS

International Search Report dated Mar. 30, 2010 for International Application No. PCT/2009/064538.

(Continued)

*Primary Examiner* — Hai Vo
(74) *Attorney, Agent, or Firm* — Cantor Colburn LLP

(57) ABSTRACT

Disclosed herein is a polymeric sheet that includes a first polymeric layer; and a second foamed layer; the first polymeric layer being in operative communication with the second foamed layer; the polymeric sheet having a percent light transmission as measured according to ASTM D 1003 of about 3% to about 80% at a thickness of greater than or equal to about 1,000 micrometers. Disclosed herein too is a method that includes disposing a first polymeric layer upon a second foamed layer to form a polymeric sheet; the first polymeric layer being in operative communication with the second foamed layer; the polymeric sheet having a percent light transmission as measured according to ASTM D 1003 of about 3% to about 80% at a thickness of greater than or equal to about 1,000 micrometers.

13 Claims, 4 Drawing Sheets

(56) References Cited

U.S. PATENT DOCUMENTS

| | | | |
|---|---|---|---|
| 4,587,272 | A | 5/1986 | Avakian et al. |
| 4,683,247 | A | 7/1987 | Allen et al. |
| 4,684,571 | A | 8/1987 | Kunert et al. |
| 4,737,523 | A | 4/1988 | White et al. |
| 4,816,492 | A | 3/1989 | Schiller et al. |
| 4,847,150 | A | 7/1989 | Takeda |
| 4,889,669 | A | 12/1989 | Suzuki |
| 5,147,481 | A | 9/1992 | Deblander |
| 5,158,985 | A | 10/1992 | Kohler et al. |
| 5,158,986 | A | 10/1992 | Cha et al. |
| 5,207,493 | A | 5/1993 | Murase et al. |
| 5,215,691 | A | 6/1993 | Bland et al. |
| 5,256,702 | A | 10/1993 | Grigat et al. |
| 5,308,558 | A | 5/1994 | Woldenberg et al. |
| 5,314,925 | A | 5/1994 | Burnell et al. |
| 5,348,790 | A | 9/1994 | Ben-Zvi et al. |
| 5,411,683 | A | 5/1995 | Shah |
| 5,622,732 | A | 4/1997 | Beckwith |
| 5,854,294 | A | 12/1998 | Hirosawa et al. |
| 5,985,190 | A | 11/1999 | Harfmann |
| 6,256,937 | B1 | 7/2001 | Kogure et al. |
| 6,274,640 | B1 | 8/2001 | Miller et al. |
| 6,358,599 | B1 | 3/2002 | Deibel et al. |
| 6,383,424 | B1 | 5/2002 | Huang et al. |
| 6,383,425 | B1 | 5/2002 | Wu et al. |
| 6,391,931 | B1 | 5/2002 | Gehlsen et al. |
| 6,403,663 | B1 | 6/2002 | DeSimone et al. |
| 6,440,241 | B1 | 8/2002 | Mason et al. |
| RE37,932 | E | 12/2002 | Baldwin et al. |
| 6,492,015 | B1 | 12/2002 | Aoki et al. |
| 6,593,384 | B2 | 7/2003 | Anderson et al. |
| 6,623,674 | B1 | 9/2003 | Gehlsen et al. |
| 6,659,020 | B1 | 12/2003 | Ball |
| 6,773,787 | B2 | 8/2004 | Maas et al. |
| 6,884,377 | B1 | 4/2005 | Burnham et al. |
| 6,916,528 | B2 | 7/2005 | Zhou et al. |
| 6,946,090 | B2 | 9/2005 | Myer et al. |
| 6,958,365 | B2 | 10/2005 | Dontula et al. |
| 6,974,850 | B2 | 12/2005 | McMan et al. |
| 2003/0068485 | A1 | 4/2003 | Ramsey |
| 2004/0002559 | A1 | 1/2004 | Troutman et al. |
| 2004/0167241 | A1 | 8/2004 | Scherzer et al. |
| 2004/0242735 | A1* | 12/2004 | McMan et al. ............ 524/91 |
| 2006/0148920 | A1 | 7/2006 | Musgrave et al. |
| 2006/0246806 | A1* | 11/2006 | Rhine et al. ............ 442/417 |
| 2006/0257594 | A1* | 11/2006 | Haas et al. ............ 428/32.34 |
| 2007/0078220 | A1 | 4/2007 | Pudleiner et al. |
| 2008/0057148 | A1 | 3/2008 | Pitch et al. |
| 2008/0085385 | A1* | 4/2008 | Ylitalo et al. ............ 428/32.38 |
| 2008/0229704 | A1* | 9/2008 | Augustyniak et al. ........ 52/782.1 |
| 2008/0287561 | A1* | 11/2008 | Menashi et al. ............ 521/142 |
| 2009/0148665 | A1* | 6/2009 | Thiagarajan et al. ........ 428/159 |
| 2009/0168183 | A1 | 7/2009 | Kim et al. |

FOREIGN PATENT DOCUMENTS

| | | |
|---|---|---|
| EP | 1879056 A1 | 1/2008 |
| EP | 1906215 A1 | 4/2008 |
| JP | 2001201616 | 7/2001 |
| JP | 200499701 A | 4/2004 |
| JP | 2006321887 | 11/2006 |
| JP | 2007279324 A2 | 10/2007 |
| JP | 2008069319 A2 | 3/2008 |
| WO | 9604211 A1 | 2/1996 |
| WO | 2007146945 A2 | 12/2007 |
| WO | 2008110925 A2 | 9/2008 |
| WO | 2009013655 A2 | 1/2009 |

OTHER PUBLICATIONS

Written Opinion dated Mar. 30, 2010 for International Application No. PCT/2009/064538.

European Patent No. 0175965; Publication Date: Apr. 2, 1986; Abstract Only; 1 Page.

Frederik W.B. Hoolhorst, U.S. Appl. No. 11/463,927, "Polymer Sheeting", filed Aug. 11, 2006.

Chinese Patent No. CN1833008 (A); Publication Date: Sep. 13, 2006; Abstract Only; 1 Page.

Chinese Patent No. 2548167 (Y); Publication Date: Apr. 30, 2003; Abstract Only; 1 Page.

Graff, "High-Performance Foams Fill Growing Market Niche"; www.Omnexus.com, Jun. 1, 2005, 8 pages.

* cited by examiner

US 8,859,091 B2

COLORED DIFFUSION SHEETS, METHODS OF MANUFACTURE THEREOF AND ARTICLES COMPRISING THE SAME

BACKGROUND OF THE INVENTION

This disclosure relates to colored diffusion sheets, methods of manufacture thereof and to articles comprising the same.

Polymeric sheets are often used for displaying commercial signs and other forms of visual art. It is desirable for such polymeric sheets to display these signs and forms of art with a high intensity while at the same time mitigating the brightness of light sources that illuminate the sign. It is therefore desirable for the signs to have a beautiful appearance with uniformity of color. In addition, since the polymeric sheet is exposed to the elements of nature such as light, rain, high winds, and the like, it is desirable for the polymeric sheet to have a high stiffness, to be light in weight, to be resistant to weathering, to have a high impact resistance and stiffness.

In order to make commercial signs environmentally friendly, light emitting diodes (LEDs) are often employed as sources of light. LEDs consume less energy than other sources of light and provide efficient colored light as well. They thus provide high luminance for a unit of energy consumed with compared with other sources of light. The high luminance of LEDs unfortunately causes the light displayed by such signs to be non-uniform.

It is therefore desirable to use polymeric sheets, which when used in conjunction with LEDs permits a sign to be uniformly illuminated.

BRIEF DESCRIPTION OF THE INVENTION

Disclosed herein is a polymeric sheet that comprises a first polymeric layer; and a second foamed layer; the first polymeric layer being in operative communication with the second foamed layer; the polymeric sheet having a percent light transmission as measured according to ASTM D 1003 of about 3% to about 80% at a thickness of greater than or equal to about 1,000 micrometers.

Disclosed herein too is a method that comprises disposing a first polymeric layer upon a second foamed layer to form a polymeric sheet; the first polymeric layer being in operative communication with the second foamed layer; the polymeric sheet having a percent light transmission as measured according to ASTM D 1003 of about 3% to about 80% at a thickness of greater than or equal to about 1,000 micrometers.

Disclosed herein too are article manufactured from the polymeric sheet as well as articles manufactured by the aforementioned method.

DETAILED DESCRIPTION OF THE INVENTION

Disclosed herein are polymeric sheets that can be used for displaying commercial signs and other forms of visual art (hereinafter displays) that permit uniform illumination across a large surface area of greater than or equal to about 9 square centimeters. The polymeric sheets permit uniform illumination in displays that employ different types of lighting including incandescent lighting, fluorescent lighting, high intensity discharge lamps, gas discharge lamps and other forms of lighting that include LEDs, solid state lighting, electroluminescent lighting, chemiluminescent lighting, or the like, or a combination comprising at least one of the foregoing forms of lighting. The polymeric sheet is a multilayered sheet comprising a first polymeric layer and a second foamed layer that are in operative communication with one another. In an exemplary embodiment, a surface of the first polymeric layer is disposed upon and in intimate contact with a surface of the second foamed layer.

Figure 1:
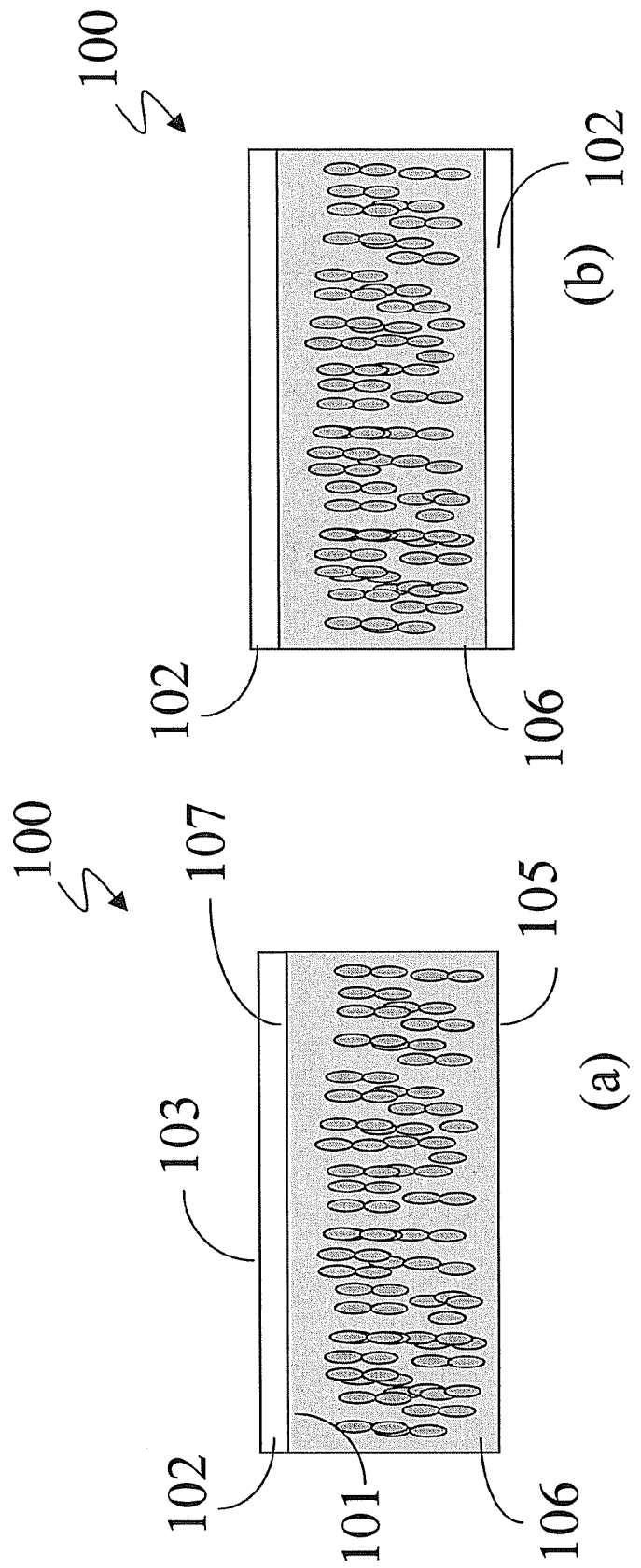
FIG. 1(a) is an exemplary depiction of the polymeric sheet that comprises the first polymeric layer in physical communication with the second foamed layer.
FIG. 1(b) is an exemplary depiction of the polymeric sheet that comprises a first polymeric layer in physical communication with opposing surfaces the second foamed layer.

With reference now to the FIG. 1(a), the polymeric sheet 100 comprises the first polymeric layer 102 in physical communication with the second foamed layer 106. As shown in the FIG. 2, the first polymeric layer 102 can be disposed on opposing surfaces of the second foamed layer 106. FIG. 1(b) is an exemplary depiction of a polymeric sheet that comprises two first polymeric layers. Each first polymeric layer is in physical communication with a surface of the second foamed layer. As can be seen in the FIG. 1(b), one first polymeric layer contacts the second foamed layer 106, while the second polymeric layer contacts the second foamed layer 106.

The first polymeric layer 102 generally comprises a first additive composition that allows for a light transmission of greater than or equal to about 75% while at the same time providing sufficient hiding power for the source of lighting. The first polymeric layer 102 has a first surface 101 and a second surface 103 that is opposed to the first surface 101. In one embodiment, the function of the first polymeric layer 102 is to enable uniform color distribution as well as to provide a uniform distribution of luminance intensity across the entire display. Examples of additives in the first additive composition are light scattering additives, pigments, optical brighteners, UV additives, angular metamerism additives, mirrorizing additives, or the like, or a combination comprising at least one of the foregoing additives. The first polymeric layer 102 can be an optically transparent layer or a translucent layer.

The second foamed layer 106 has cells of a size effective to scatter light. The second foamed layer 106 has a first surface 105 and a second surface 107 that is opposed to the first surface 105. As can be seen in the FIG. 1, the first surface 101 of the first polymeric layer 102 is disposed upon and in intimate contact with the second surface 107 of the second foamed layer 106. The second foamed layer 106 serves to function as a light diffusing layer, i.e., it diffuses light incident from a source of lighting (e.g., LEDs, fluorescent lights, and the like) that is used to illuminate art that is disposed upon the polymeric sheet. The second foamed layer 106 may be a closed cell foam, an open cell foam, or a foam having a combination of open cells and closed cells. The second foamed layer 106 may comprise an aerogel, a reticulated foam, a syntactic foam, or the like, or a combination comprising at least one of the foregoing foams.

In addition to the aforementioned layers, other layers, such as, for example, a third layer comprising UV absorbing additives, a fourth layer that comprises UV absorbing additive and a pigment, a fifth layer that provides abrasion resistance, and so on.

The respective polymeric layers (e.g., the first, second, third, fourth polymeric layers, and the like) can comprise an organic polymer. Examples of organic polymers are thermoplastic polymers, thermosetting polymers, blends of thermoplastic polymers, blends of thermosetting polymers, and blends of thermoplastic polymers with thermosetting polymers.

The thermoplastic polymer may be a blend of polymers, copolymers, terpolymers, or combinations comprising at least one of the foregoing thermoplastic polymers. The thermoplastic polymer can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at last one of the foregoing thermoplastic polymers.

Examples of the thermoplastic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, or the like, or a combination comprising at least one of the foregoing thermoplastic polymers.

Examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleicanhydride/acrylonitrile-butadiene-styrene, polyether etherketone/polyethersulfone, polyether etherketone/polyetherimide polyethylene/nylon, polyethylene/polyacetal, or the like.

Blends of optically transparent organic polymers may also be used in the polymeric sheets. Preferred organic polymer blends are polycarbonate (PC)-poly(1,4-cyclohexanedimethanol-1,4-cyclohexanedicarboxylate) (PCCD), PC-poly(cyclohexanedimethanol-co-ethylene terephthalate) (PETG), PC-polyethylene terephthalate (PET), PC-polybutylene terephthalate (PBT), PC-polymethylmethacrylate (PMMA), PC-PCCD-PETG, resorcinol aryl polyester-PCCD, resorcinol aryl polyester-PETG, PC-resorcinol aryl polyester, resorcinol aryl polyester-polymethylmethacrylate (PMMA), resorcinol aryl polyester-PCCD-PETG, a copolymer comprising 1,1-(bis(4-hydroxy-3-methylphenyl) cyclohexane and bisphenol A, or the like, or a combination comprising at least one of the foregoing.

Examples of thermosetting resins include polyurethane, natural rubber, synthetic rubber, epoxy, phenolic, polyesters, polyamides, silicones, or the like, or a combination comprising at least one of the foregoing thermosetting resins. Blends of thermoset resins as well as blends of thermoplastic resins with thermosets can be utilized.

The organic polymer is generally used in amounts of about 10 to about 90 weight percent (wt %), of the total weight of the first polymeric layer. The organic polymer is generally used in amounts of greater than or equal to about 33, specifically greater than or equal to about 35, and more specifically greater than or equal to about 40 wt %, of the total weight of the first polymeric layer. The organic polymer is furthermore generally used in amounts of less than or equal to about 80, specifically less than or equal to about 75, and more specifically less than or equal to about 70 wt %, of the total weight of the first polymeric layer.

The first polymeric layer can comprise light scattering agents that scatter light incident on it from the sources of lighting. This facilitates a uniform dispersion of light incident upon the first polymeric layer. Examples of suitable light scattering agents are TOSPEARL®, polymethylmethacrylate particles, methacrylate butadiene styrene particles, titanium dioxide, barium sulfate, silicon dioxide, aluminum oxide, zinc oxide, or the like, or a combination comprising at least one of the foregoing particles. The light scattering can also be produced by roughening a surface of the first polymeric layer. In one embodiment, the second surface 103 of the first polymeric layer can be roughened. Additionally scattering can be produced by the addition of light scattering agents to the first polymeric layer and by roughening a surface of the first polymeric layer. The surface of the first polymer layer that is not in contact with the second foamed layer is roughened to enable the diffusion or scattering of light.

The light scattering agent is generally used in amounts of about 1 to about 20 weight percent (wt %), of the total weight of the first polymeric layer. The light scattering agent is generally used in amounts of greater than or equal to about 2, specifically greater than or equal to about 3, and more specifically greater than or equal to about 4 wt %, of the total weight of the first polymeric layer. The light scattering agent is furthermore generally used in amounts of less than or equal to about 19, specifically less than or equal to about 18, and more specifically less than or equal to about 17 wt %, of the total weight of the first polymeric layer.

The first polymeric layer comprises optical brighteners. Examples of optical brighteners include optical brightening agents (OBAs), fluorescent brightening agents (FBAs), fluorescent whitening agents (FWAs), or the like, or a combination comprising at least one of the foregoing optical brighteners. Optical brighteners are dyes that absorb light in the ultraviolet and violet region (usually about 340 to about 370 nanometers) of the electromagnetic spectrum, and re-emit light in the blue region (usually about 420 to about 470 nanometers). These additives are often used to enhance the appearance of color of the first polymeric layer, causing a perceived "whitening" effect, making materials look less yellow by increasing the overall amount of blue light reflected. Examples of optical brighteners are triazine-stilbenes (di-, tetra- or hexa-sulfonated), coumarins, imidazolines, diazoles, triazoles, benzoxazolines, biphenyl-stilbenes, or the like or a combination comprising at least one of the foregoing optical brighteners.

Optical brighteners can be "boosted" by the addition of certain polyols like high molecular weight polyethylene glycol or polyvinyl alcohol. These additives increase the visible blue light emissions significantly.

The optical brightener is generally used in amounts of about 1 to about 20 weight percent (wt %), of the total weight of the first polymeric layer. The optical brightener is generally used in amounts of greater than or equal to about 2, specifically greater than or equal to about 3, and more specifically greater than or equal to about 4 wt %, of the total weight of the first polymeric layer. The optical brightener is furthermore generally used in amounts of less than or equal to about 19, specifically less than or equal to about 18, and more specifically less than or equal to about 17 wt %, of the total weight of the first polymeric layer.

As noted above the first polymeric layer can contain pigments and dyes (hereinafter pigments). The pigments can be organic pigments, inorganic pigments, or a combination comprising at least one of the foregoing pigments.

Examples of suitable organic pigments are phthalocyanines and their derivatives, porphyrins and their derivatives, pyrenes and their derivatives, anthracenes and their derivatives, anthranones and their derivatives; anthraquinones and their derivatives; croconines and their derivatives; monoazos, disazos, trisazos and their derivatives; benzimidazolones and their derivatives; diketo pyrrole pyrroles and their derivatives; dioxazines and their derivatives; diarylides and their derivatives; indanthrones and their derivatives; isoindolines and their derivatives; isoindolinones and their derivatives; naphtols and their derivatives; perinones and their derivatives; perylenes and their derivatives such as perylenic acid anhydride or perylenic acid imide; ansanthrones and their derivative; dibenzpyrenequinones and their derivatives; pyranthrones and their derivatives; bioranthorones and their derivatives; isobioranthorone and their derivatives; diphenylmethane, and triphenylmethane, type pigments; cyanine and azomethine type pigments; indigoid type pigments; bisbenzoimidazole type pigments; azulenium salts; pyrylium salts; thiapyrylium salts; benzopyrylium salts; pryanthrones and their derivatives; quinacidones and their derivatives; quinophthalones and their derivatives; squaraines and their derivatives; squarilylums and their derivatives; leuco dyes and their derivatives, deuterated leuco dyes and their derivatives; leuco-azine dyes; acridines; di- and tri-arylmethane, dyes; quinoneamines; o-nitro-substituted arylidene dyes, aryl nitrone dyes, or the like, or a combination comprising at least one of the foregoing organic pigments.

Examples of suitable inorganic pigments are antimony trioxide, azurite, barium sulfate, cadmium pigments, cadmium sulfide, calcium chromate, chrome orange, chrome yellow, chromium(III) oxide, cobalt blue, cobalt green, Egyptian blue, Engineer's blue, lead tetroxide, lithopone, marking blue, Mosaic gold, Naples yellow, orpiment, Paris green, Payne's grey, prussian blue, Scheele's Green, titanium dioxide, titanium yellow, ultramarine, venetian ceruse, vermilion, viridian, white lead, zaffre, zinc oxide, zinc phosphate, or a combination comprising at least one of the foregoing inorganic pigments.

The pigment is generally used in amounts of about 1 to about 20 weight percent (wt %), of the total weight of the first polymeric layer. The pigment is generally used in amounts of greater than or equal to about 2, specifically greater than or equal to about 3, and more specifically greater than or equal to about 4 wt %, of the total weight of the first polymeric layer. The pigment is furthermore generally used in amounts of less than or equal to about 19, specifically less than or equal to about 18, and more specifically less than or equal to about 17 wt %, of the total weight of the first polymeric layer.

As noted above, the first polymeric layer also comprises UV absorbing additives. Examples of suitable UV absorbing additives benzophenones such as 2,4 dihydroxybenzophenone, 2-hydroxy-4-methoxybenzophenone, 2-hydroxy-4-n-octoxybenzophenone, 4-dodecyloxy-2 hydroxybenzophenone, 2-hydroxy-4-octadecyloxybenzophenone, 2,2' dihydroxy-4 methoxybenzophenone, 2,2' dihydroxy-4, 4'dimethoxybenzophenone, 2,2' dihydroxy-4 methoxybenzophenone, 2,2',4,4' tetra hydroxybenzophenone, 2-hydroxy-4-methoxy-5 sulfobenzophenone, 2-hydroxy-4-methoxy-2'-carboxybenzophenone, 2,2'dihydroxy-4,4'dimethoxy-5 sulfobenzophenone, 2-hydroxy-4-(2-hydroxy-3-methylaryloxy)propoxybenzophenone, 2-hydroxy-4 chlorobenzopheone, or the like; benzotriazoles such as 2,2'-(hydroxy-5-methyl phenyl)benzotriazole, 2,2'-(hydroxy-3',5'-ditert-butyl phenyl)benzotriazole, and 2,2'-(hydroxy-X-tert, butyl-5'-methyl-phenyl)benzotriazole, or the like; salicylates such as phenyl salicylate, carboxyphenyl salicylate, p-octylphenyl salicylate, strontium salicylate, p-tert butylphenyl salicylate, methyl salicylate, dodecyl salicylate, or the like; and also other ultraviolet absorbents such as resorcinol monobenzoate, 2-ethylhexyl-2-cyano, 3-phenylcinnamate, 2-ethylhexyl-2-cyano-3,3-diphenyl acrylate, ethyl-2-cyano-3,3-diphenyl acrylate, 2-2'-thiobis(4-t-octylphenolate)-1-n-butylamine, or the like, or combinations comprising at least one of the foregoing UV absorbing additives. Examples of commercially available UV absorbers are TINUVIN 234, TINUVIN 329, TINUVIN 350 and TINUVIN 360, commercially available from Ciba Specialty Chemicals; UV-5411 (also known as Cyasorb UV5411) commercially available from Cyanamid; and UVINOL 3030 commercially available from BASF. For articles formed by extrusion, UVINOL 3030 is particularly preferred due to its low volatility. UV0006 can also be used. The UV absorbing additives are generally used in amounts of about 1 to about 20 weight percent (wt %), of the total weight of the first polymeric layer. The UV absorbing additives are generally used in amounts of greater than or equal to about 2, specifically greater than or equal to about 3, and more specifically greater than or equal to about 4 wt %, of the total weight of the first polymeric layer. The UV absorbing additives are furthermore generally used in amounts of less than or equal to about 19, specifically less than or equal to about 18, and more specifically less than or equal to about 17 wt %, of the total weight of the first polymeric layer.

In one embodiment, the first polymeric layer has a clarity (e.g., hiding power) of greater than or equal to about 20, specifically greater than or equal to about 30, measured using the BYK Gardner Test equipment as per ASTM D 1003.

The first polymeric layer generally has a thickness of greater than or equal to about 0.01 micrometers. In one embodiment, the first polymeric layer has a thickness of about 0.1 micrometers to about 5,000 micrometers, specifically about 0.5 micrometers to about 3,000 micrometers, and more specifically about 1.0 to about 2,500 micrometers.

The second foamed layer 106 comprises a foam that has a cell size that varies between about 10 nanometers to about 1 millimeter. The foams have a density of about 0.001 grams per cubic centimeter ($g/cm^3$) to about 1.1 $g/cm^3$. The foam may be an aerogel, a reticulated foam, a non-reticulated foam, a syntactic foam, or the like. Aerogels can be inorganic or organic. Inorganic aerogels comprise inorganic oxides; the inorganic oxides being silica, titania, alumina, zirconia, or the like, or a combination comprising at least one of the foregoing inorganic oxides. Organic aerogels comprise resorcinol-formaldehyde, carbon-resorcinol-formaldehyde, or the like. Aerogels have very small pores on the order of nanometers. In one embodiment, aerogel particles can be bound together with a polymeric binder to form the second foamed layer. The polymeric binder can be in the form of a foam.

The aerogels generally have pore sizes of about 1 to about 100 nanometers. In one embodiment, the aerogels have pore sizes of greater than or equal to about 2 nanometers, specifically greater than or equal to about 5 nanometers, and more specifically greater than or equal to about 10 nanometers. In another embodiment, the aerogels have pore sizes of less than or equal to about 90 nanometers, specifically less than or equal to about 80 nanometers, and more specifically less than or equal to about 70 nanometers.

Some of the polymers that can be used in the second foamed layer have been listed above. As will be seen from the aforementioned list, polymers having a glass transition temperature of about −150° C. to about 300° C. can be used in the second foamed layer. In one embodiment, polymers having glass transition temperatures greater than or equal to about room temperature (23° C.) may be used in the second foamed layer. In another embodiment, it is desirable for the polymers used in the second foamed layer to have a glass transition temperature greater than or equal to about 40° C., specifically greater than or equal to about 70° C., and more specifically greater than or equal to about 150° C. Examples of organic polymers that can be used in the second foamed layer are polycarbonates, high heat polycarbonates, resorcinol aryl polyester, copolymers of polycarbonate with polydimethylsiloxane, polyethylene terephthalate, high heat polyesters, polybutylene terephthalate, poly(1,4-cyclohexane-dimethanol-1,4-cyclohexanedicarboxylate) (PCCD), poly(cyclohexanedimethanol-co-ethylene terephthalate) (PETG), polymethylmethacrylate (PMMA), resorcinol aryl polyester, polyetherimide, fluorinated ethylene polymers, polystyrene, polyvinyl chloride, polypropylene, polyurethanes, or the like, or a combination comprising at least one of the foregoing organic polymers.

The foam (used in the second foamed layer) can be classified into two types based on their pore structure. The first type of foams are called open cell foams. The open cell foams contain pores that are connected to each other and form an interconnected network which is relatively soft. The second type of foams does not have interconnected pores and are called closed cell foams. In one embodiment, the closed cell foams can have higher a compressive strength due to their structures. The closed cells can be filled with a specialized gas to provide improved insulation.

The foam (in the second foamed layer) can also be a polymeric reticulated foam or a non-reticulated foam. Foams can be produced by mechanical agitation (e.g., polyurethane foams) or by the use of blowing agents (e.g., polyolefin foams). Blowing agents can by classified into physical blowing agents or chemical blowing agents.

Examples of physical blowing agents are those comprising hydrogen atom-containing components, which may be used alone or as mixtures with each other or with another type of blowing agent such as water or azo compounds. These blowing agents may be selected from a broad range of materials, including hydrocarbons, ethers, esters and partially halogenated hydrocarbons, ethers and esters, and the like. Physical blowing agents generally have a boiling point of about −50° C. to about 100° C., and specifically about −25° C. to about 50° C. Among the usable hydrogen-containing blowing agents are the HCFC's (halo chlorofluorocarbons) such as 1,1-dichloro-1-fluoroethane, 1,1-dichloro-2, 2,2-trifluoroethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFE's (halo fluoroethers) such as methyl-1,1,1-trifluoroethylether and difluoromethyl-1,1,1-trifluoroethylether; and the hydrocarbons such as n-pentane, isopentane, and cyclopentane.

Included among the normally gaseous and liquid blowing agents are the halogen derivatives of methane and ethane, such as methyl fluoride, methyl chloride, difluoromethane, methylene chloride, perfluoromethane, trichloromethane, difluoro-chloromethane, dichlorofluoromethane, dichlorodifluoromethane (CFC-12), trifluorochloromethane, trichloromonofluoromethane (CFC-11), ethyl fluoride, ethyl chloride, 2,2,2-trifluoro-1,1-dichloroethane (HCFC-123), 1,1,1-trichloroethane, difluorotetrachloroethane, 1,1-dichloro-1-fluoroethane (HCFC-141b), 1,1-difluoro-1-chloroethane (HCFC-142b), dichlorotetrafluoroethane (CFC-114), chlorotrifluoroethane, trichlorotrifluoroethane (CFC-113), 1-chloro-1,2,2,2-tetrafluoroethane (HCFC-124), 1,1-difluoroethane (HFC-152a), 1,1,1-trifluoroethane (HFC-143a), 1,1,1,2-tetrafluoroethane (HFC-134a), perfluoroethane, pentafluoroethane, 2,2-difluoropropane, 1,1,1-trifluoropropane, perfluoropropane, dichloropropane, difluoropropane, chloroheptafluoropropane, dichlorohexafluoropropane, perfluorobutane, perfluorocyclobutane, sulfur-hexafluoride, and mixtures thereof.

Other normally gaseous and liquid blowing agents that may be employed are hydrocarbons and other organic compounds such as acetylene, ammonia, butadiene, butane, butene, isobutane, isobutylene, dimethylamine, propane, dimethylpropane, ethane, ethylamine, methane, monomethylamine, trimethylamine, pentane, cyclopentane, hexane, propane, propylene, alcohols, ethers, ketones, and the like. Inert gases and compounds, such as carbon dioxide, nitrogen, argon, neon, or helium, may be used as blowing agents with satisfactory results. A physical blowing agent may be used to produce foam directly out of the extrusion die. The composition may optionally include chemical foaming agents for further expansion. Exemplary physical blowing agents are carbon dioxide and nitrogen.

Solid, chemical blowing agents, which decompose at elevated temperatures to form gases, may be used. In general, the decomposable foaming agent will have a decomposition temperature (with the resulting liberation of gaseous material) of about 130° C. to about 350° C. Representative chemical blowing agents include azodicarbonamide, p,p'-oxybis (benzene)sulfonyl hydrazide, p-toluene sulfonyl hydrazide, p-toluene sulfonyl semicarbazide, 5-phenyltetrazole, ethyl-5-phenyltetrazole, dinitroso pentamethylenetetramine, and other azo, N-nitroso, carbonate and sulfonyl hydrazides as well as various acid/bicarbonate compounds, which decompose when heated.

In one embodiment, the cells of the polymeric foams can have a cell size of about 0.1 micrometers to about 100 micrometers, specifically about 1 micrometer to about 80 micrometers, and more specifically about 5 to about 50 micrometers.

In one embodiment, the second foamed layer has a clarity (e.g., hiding power) of less than 10, specifically less than or equal to about 5, measured using the BYK Gardner Test equipment as per ASTM D 1003.

It is desirable for the second foamed layer to have a porosity of about 70 volume percent to about 99.8 volume percent, specifically about 80 to about 99.6 volume percent and more specifically about 85 to about 99.4 volume percent, based on the total volume of the foam.

As noted above, the second foamed layer can comprise a syntactic foam. Syntactic foams are composite materials synthesized by filling a metal, polymer or ceramic matrix with hollow particles called microballoons. The presence of hollow particles results in lower density, higher strength and a lower thermal expansion coefficient. Tailorability is one of the biggest advantages of these materials. The matrix material can be selected from almost any metal, polymer or ceramic. Exemplary matrix materials are polymers. Examples of microballoons are cenospheres, glass microspheres, carbon and polymer microballoons. Instead of microballoons, other fillers such as titanium dioxide, barium sulfate, silicon dioxide, silicone spheres or microspheres (e.g., TOSPEARL®), polymethylmethacrylate particles, or the like, or a combination comprising at least one of the foregoing fillers can be used.

The compressive properties of syntactic foams primarily depend on the properties of microballoons, whereas the tensile properties depend on the matrix material that holds the microballoons together. There are two main ways of adjusting the properties of these materials. The first method is to change the volume fraction of microballoon in the syntactic foam structure. The second method is to use microballoons of different wall thickness. In general, the compressive strength of the material is proportional to its density.

Glass microspheres can be made by heating tiny droplets of dissolved water glass in a process known as ultrasonic spray pyrolysis. Microspheres are also used in composites to fill polymer resins for specific characteristics such as weight, sandability and sealing surfaces.

Glass microspheres are manufactured for wide a variety of uses in research, medicine, consumer goods and various industries. Glass microspheres have diameters of about 100 nanometers to about 5 millimeters, specifically about 500 nanometers to about 1000 micrometers, and specifically about 1 micrometers to about 300 micrometers.

The second foamed layer generally has a thickness of greater than or equal to about 500 micrometers. The second foamed layer has a thickness of about 1,000 micrometers to about 10,000 micrometers, specifically about 1,500 micrometers to about 9,000 micrometers, and more specifically about 2,000 to about 8,500 micrometers.

As noted above other layers such as a third layer, a fourth layer, a fifth layer, and so on, may be added to the polymeric sheet.

The polymeric sheet containing the first polymeric layer and the second foamed layer generally has a thickness of greater than or equal to about 0.5 millimeters. In one embodiment, the polymeric sheet containing the first polymeric layer and the second foamed layer can have a thickness of about 1 millimeter to about 76 millimeters, specifically 2 millimeters to about 50 millimeters, specifically about 3 millimeters to about 20 millimeters, and more specifically about 4 to about 10 millimeters.

Figure 2:
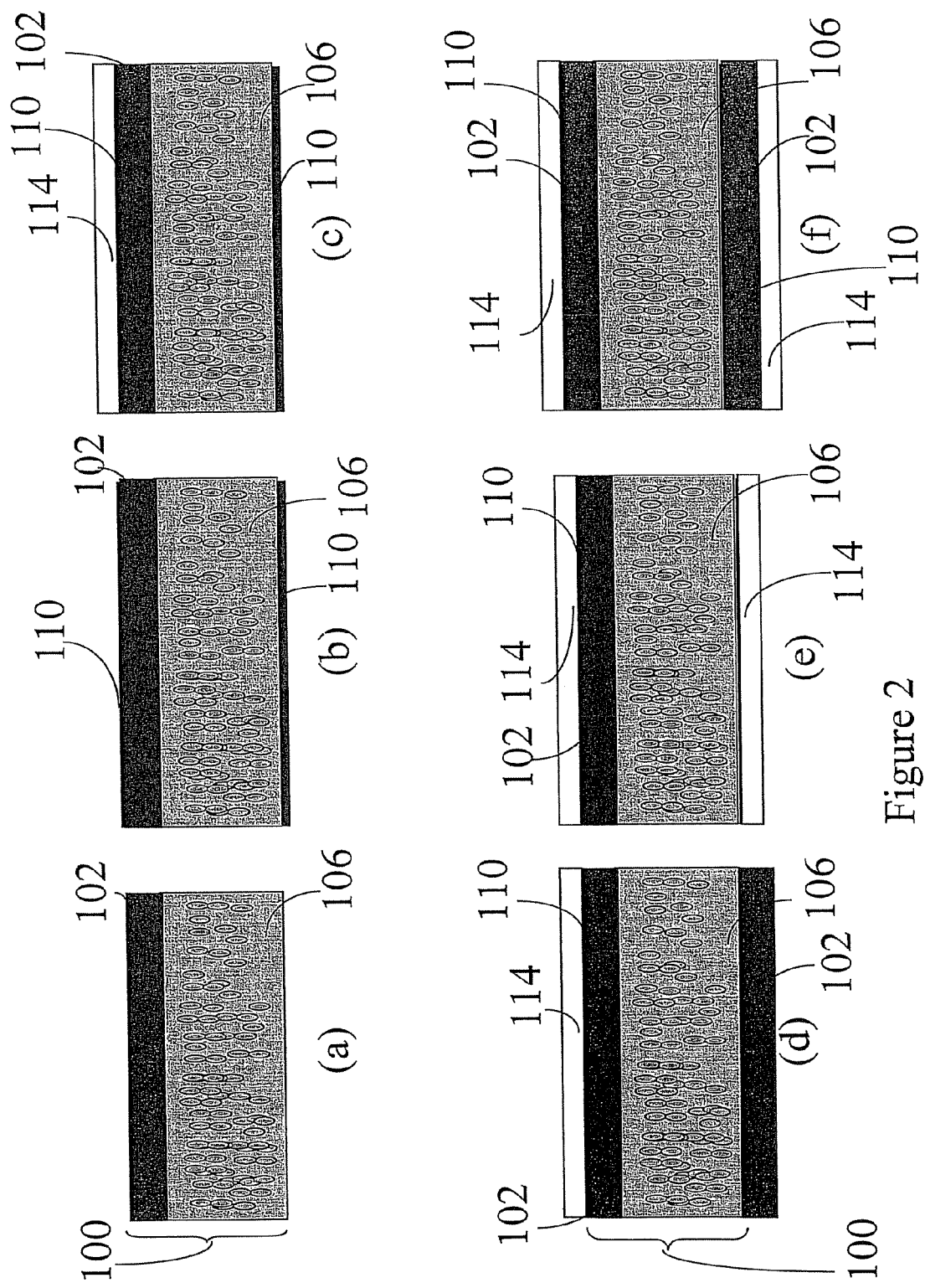
FIG. 2(a) depicts an exemplary embodiment of the polymeric sheet where the first polymeric layer contains a pigment.
FIG. 2(b) depicts an exemplary embodiment of the polymeric sheet where opposing surfaces of the polymeric sheet have a UV resistant coating.
FIG. 2(c) depicts an exemplary embodiment of the polymeric sheet where the polymeric sheet has a third polymeric layer that contains a UV absorbing additive.
FIG. 2(d) depicts and exemplary embodiment of the polymeric sheet of the FIG. 2(c) with two first polymeric layers being disposed on opposing surfaces of the second foamed sheet.
FIG. 2(e) depicts yet another exemplary embodiment of the polymeric sheet 100, wherein the polymeric sheet is coated with a plurality of UV coating layers 110 and a plurality of third polymeric layers 114.
FIG. 2(f) depicts another exemplary embodiment where the polymeric sheet has disposed on one surface a UV coating layer and a third polymeric layer, while having on an opposing surface a second UV coating layer, a second first polymeric layer and a second third polymeric layer.

The FIG. 2 depicts various exemplary embodiments of such polymeric sheets. As can be seen in the FIG. 2(a), the first polymeric layer 102 is disposed upon the second foamed layer 106 to form the polymeric sheet 100. Here the first polymeric layer 102 is colored, i.e., it contains a pigment. The first polymeric layer 102 may also contain a UV absorbing additive. The second foamed layer 106 may also contain a pigment.

In the FIG. 2(b), the first polymeric layer 102 is disposed upon the second foamed layer 106 to form the polymeric sheet 100. Disposed upon opposing surfaces of the polymeric sheet 100 is a UV resistant coating 110. The UV resistant coating may contain some of the UV absorbing additives listed above and can be applied by methods such as spin coating, painting, dip coating, spray painting, electrostatic spray painting, and the like.

The FIG. 2(c) represents the same polymeric sheet 100 shown in the FIG. 2(b) except that it has a third polymeric layer 114 containing a second UV absorbing additive disposed on one surface of the polymeric sheet 100. Though not shown, a third polymeric layer 114 can be disposed on the opposing surface of the polymeric sheet 100 from the surface depicted in the FIG. 2(c). The third polymeric layer 114 comprises a UV absorbing additive, and can contain an optional pigment.

The FIG. 2(d) depicts a polymeric sheet of the FIG. 2(c) with the first polymeric layer 102 (having a pigment therein) disposed on opposing surfaces of the second foamed sheet 106. The UV coating layer 110 and the third polymeric layer 114 can then be disposed upon the polymeric sheet 100 as shown in the FIG. 2(d). Alternatively, the UV coating layer 110 can be disposed on the opposing surface of the third polymeric layer 114 from that depicted in the FIG. 2(d).

The FIG. 2(e) depicts yet another exemplary embodiment of the polymeric sheet 100, wherein the polymeric sheet is coated with a plurality of UV coating layers 110 and a plurality of third polymeric layers 114. In this figure, a single UV coating layer 110 and a single third polymeric layer 114 are disposed upon opposing sides of the polymeric sheet 100.

The FIG. 2(f) depicts another exemplary embodiment, where the polymeric sheet 100 has disposed on one surface the UV coating layer 100 and the third polymeric layer 114, and on an opposing surface a second UV coating layer 100, a second first polymeric layer 102 and a second third polymeric layer 114.

Figure 3:
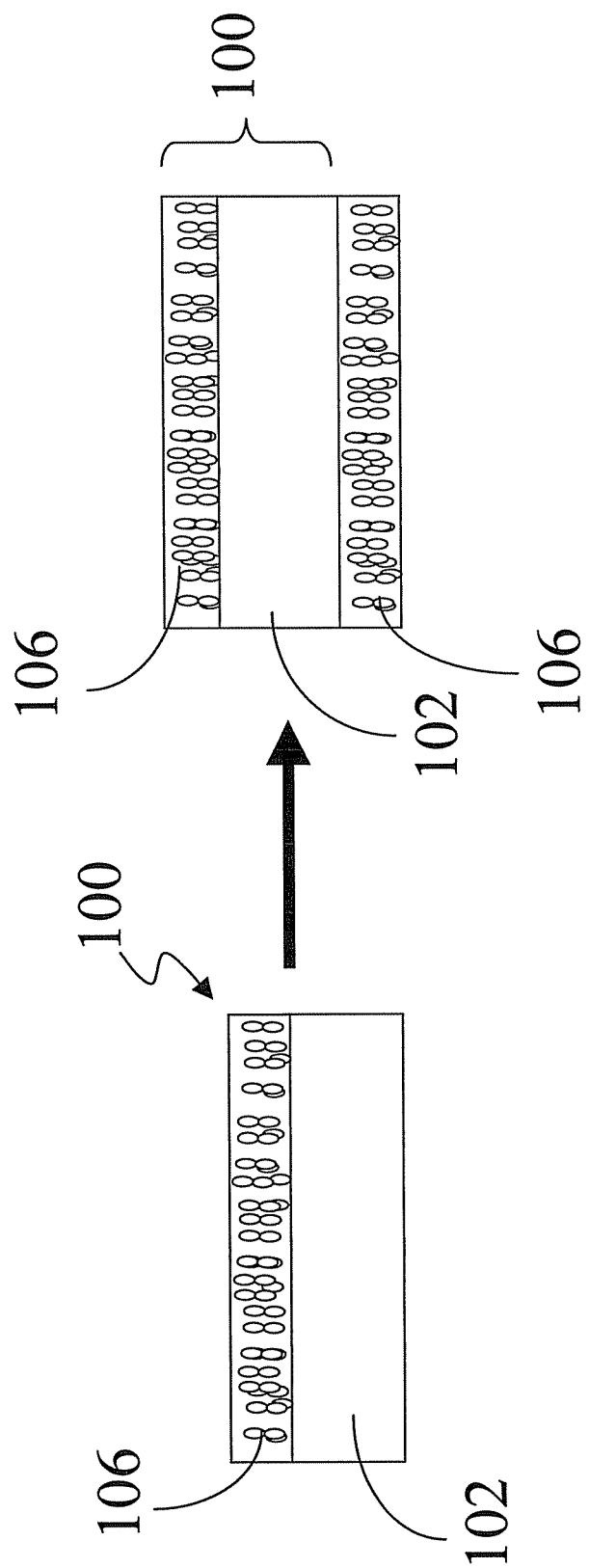
FIG. 3 depicts another exemplary embodiment where the polymeric sheet has disposed thereon additional foamed layers.

The FIG. 3 shows that the polymeric sheet 100 can have disposed thereon additional layers of the second foamed layer. Other layers (e.g., the third polymeric layer, fourth polymeric layer, a UV coating layer, and the like) can be added onto the polymeric sheet 100 as shown in the FIGS. 2(a) through 2(f).

The polymeric sheet 100 can be manufactured by a variety of different methods. In one embodiment, the first polymeric layer 102 can be manufactured by processes involving extrusion, molding, roll milling, and the like. The second foamed layer 106 can be manufactured separately by processes involving extrusion, roll milling, and the like. In one embodiment, the first polymeric layer 102 and the second foamed layer 106 can be laminated in a press, a molding machine, a roll mill, or the like, to form the polymeric sheet. In one embodiment, the first polymeric layer 102 can be bonded to the second foamed layer 106 using an adhesive.

In an exemplary embodiment, the polymeric sheet 100 can be manufactured in a process that involves coextrusion. In one embodiment, in one manner of co-extruding of the multilayered sheet, the melt streams (extrudates) from the various extruders are fed into a feed block die where the various melt streams are combined before entering the die. In another embodiment, the melt streams from the various extruders are fed into a multi-manifold internal combining die. The different melt streams enter the die separately and join just inside the final die orifice. In yet another embodiment, the melt streams from the various extruders are fed into a multi-manifold external combining die. The external combining dies have completely separate manifolds for the different melt streams as well as distinct orifices through which the streams leave the die separately, joining just beyond the die exit. The layers are combined while still molten and just downstream of the die. An exemplary die used in the production of the polymeric sheet 100 is a feed block die.

When the second foamed layer 106 is produced using an organic polymer, the organic polymer, physical blowing agents, optional crosslinking agents, optional initiators and other desired additives (e.g., pigments, optical brighteners, or the like) are fed into a melt blending device (e.g., an extruder, a Buss kneader, or the like) at the throat. Alternatively, it may be possible for the blowing agents such as liquid carbon dioxide or supercritical carbon dioxide to be pumped into the melt blending device further downstream. When physical blowing agents are pumped into melt blending device it is desirable for the melt in the device to be maintained at a certain pressure and temperature, to facilitate the solubility of the blowing agent into the melt, and also to prevent foaming of the melt within the device. The extrudate upon emerging from the melt blending device will start to foam. The density of the foam is dependent upon the solubility of the physical blowing agent within the melt, as well as the pressure and temperature differential between the melt blending device and the outside (e.g., ambient conditions). If solid-state chemical blowing agents are used, then the foam density will depend upon the amount of the chemical blowing agents used. In order to effect complete blowing of the foam, the extrudate may be further processed in high temperature ovens where radio frequency heating, microwave heating, and convectional heating may be combined.

The polymeric sheet 100 may also be produced using thermoforming. In one embodiment, the first polymeric layer may be coextruded with an adjoining polymeric layer disposed upon a surface of the first polymeric layer to form a multilayered sheet. In one embodiment, the adjoining polymeric layer can contain a blowing agent that is incorporated into it during coextrusion. In another embodiment, the coextruded multilayer sheet is immersed in a blowing agent such as carbon dioxide. During thermoforming, the adjoining layer is foamed to form the second foamed layer.

In an exemplary embodiment, the first polymeric layer 102 can be extruded from a first melt blending device, while the second foamed layer 106 is extruded from a second melt blending device. Both the first polymeric layer 102 and the second foamed layer 106 are laminated to form the polymeric sheet 100 in a roll mill. Other layers (e.g., the third polymeric layer, the fourth polymeric layer, and the like) that are bonded to the polymeric sheet 100 can be also be coextruded. Alternatively, one of the other layers can be fed of a spool and can be laminated to the polymeric sheet as shown in the FIGS. 2(a) through 2(f).

In one embodiment, the first melt blending device and/or the second melt blending device can be a single screw extruder, a twin screw extruder, a Buss kneader, or the like, or a combination comprising at least one of the foregoing devices. In an exemplary embodiment, the extruders used for the co-extrusion of the first polymeric layer and the second foamed layer are single screw extruders respectively. The co-extruded polymeric sheet may optionally be calendared in a roll mill if desired.

The polymeric sheet 100 thus produced can be subjected to thermoforming to form articles of various shapes. In one embodiment, the second foamed layer can be further foamed during thermoforming. The polymeric sheet thus manufactured can be used to make signs that are illuminated by a variety of light sources. Exemplary light sources that can be used with the polymeric sheet disclosed herein are LEDs.

The polymeric sheet 100 has a number of advantageous properties. The polymeric sheet minimizes the appearance of the color difference between the lit and unlit states for the sign or display. In one embodiment, the polymeric sheet 100 has a variation in luminance transmission as measured in a 13 point (luminance) uniformity test that is less than or equal to about 50%, specifically less than or equal to about 20%, specifically less than or equal to about 10%, and more specifically less than or equal to about 5%, across a polymeric sheet that has a surface area (on one surface) of greater than or equal to about 25 square centimeters, specifically greater than or equal to about 50 square centimeters, specifically greater than or equal to about 100 square centimeters, specifically greater than or equal to about 200 square centimeters, specifically greater than or equal to about 500 square centimeters, specifically greater than or equal to about 1,000 square centimeters, and more specifically greater than or equal to about 10,000 square centimeters. The variation in luminance is measured from the average luminance as measured across the entire sheet in the 13 point uniformity test as defined by the Video Electronics Standards Association (VESA).

In one embodiment, the polymeric sheet displays a variation in luminance of less than or equal to about 20% across a surface of the polymeric sheet; the light source being placed at a distance of about 12 to about 17 millimeters from a surface of the polymeric sheet first illuminated by light.

In another embodiment, the luminance in candelas per square centimeter ($cd/m^2$) for a polymeric sheet having a thickness of greater than or equal to about 1,000 micrometers is greater than or equal to about 100, specifically greater than or equal to about 200, and more specifically greater than or equal to about 500, when the source of illumination used to illuminate the polymeric sheet is red light, blue light, green light or a combination comprising at least one of the foregoing colored lights. In yet another embodiment, the luminance in candelas per square centimeter ($cd/m^2$) for a polymeric sheet having a thickness of greater than or equal to about 2,500 micrometers is greater than or equal to about 100, specifically greater than or equal to about 200, and more specifically greater than or equal to about 500, when the source of illumination used to illuminate the polymeric sheet is red light, blue light, green light or a combination comprising at least one of the foregoing colored lights.

In another embodiment, the luminance in candelas per square centimeter ($cd/m^2$) for a polymeric sheet having a thickness of greater than or equal to about 1,000 micrometers that is greater than or equal to about 1,000, specifically greater than or equal to about 2,000, and more specifically greater than or equal to about 5,000, when the source of illumination used to illuminate the polymeric sheet is white light. In yet another embodiment, the luminance in candelas per square centimeter (cd/m$^2$) for a polymeric sheet having a thickness of greater than or equal to about 2,500 micrometers that is greater than or equal to about 1,000, specifically greater than or equal to about 2,000, and more specifically greater than or equal to about 5,000, when the source of illumination used to illuminate the polymeric sheet is white light.

In another embodiment, the percent light transmission as measured according to a light transmission Illumination C test as per ASTM D 2244 is about 3% to about 80%, specifically about 4 to about 50%, specifically about 5 to about 45% and more specifically about 10 to about 40% for a polymeric sheet having a thickness of greater than or equal to about 1,000 micrometers and a surface area (on one surface) of greater than or equal to about 25 square centimeters, specifically greater than or equal to about 50 square centimeters, specifically greater than or equal to about 100 square centimeters, specifically greater than or equal to about 200 square centimeters, specifically greater than or equal to about 500 square centimeters, specifically greater than or equal to about 1,000 square centimeters, and more specifically greater than or equal to about 10,000 square centimeters.

In yet another embodiment, the percent light transmission as measured according to a light transmission Illumination C test as per ASTM D 2244 is about 3% to about 80%, specifically about 4 to about 50%, specifically about 5 to about 45% and more specifically about 10 to about 40% for a polymeric sheet having a thickness of greater than or equal to about 1,500 micrometers, specifically a thickness of greater than or equal to about 2,000 micrometers, and more specifically a thickness of greater than or equal to about 2,500 micrometers and a surface area (on one surface) of greater than or equal to about 25 square greater than or equal to about 100 square centimeters, specifically greater than or equal to about 200 square centimeters, specifically greater than or equal to about 500 square centimeters, specifically greater than or equal to about 1,000 square centimeters, and more specifically greater than or equal to about 10,000 square centimeters.

As noted above, the polymeric sheet can be used in a variety of different articles. In one embodiment, it can be advantageously used for displaying signs such as commercial signs, artwork, graphics, advertisements, and other messages that are to be viewed by the public.

The following examples, which are meant to be exemplary, not limiting, illustrate compositions and methods of manufacturing some of the various embodiments of the polymeric sheets disclosed herein.

EXAMPLES

Example 1

This example was conducted to demonstrate the hiding power of the polymeric sheets disclosed herein and their advantages over comparative sheets that are commercially available and are currently used in lighted signs.

Five comparative samples (Sample #'s 1-5 in the Tables 1 and 2 below) and eight samples (Sample #s 6-13 in the Tables 1 and 2 below) manufactured from the polymeric sheets (that exemplify the samples of this disclosure) were subjected to an illumination test to determine the percent luminance. Haze, diffuse percent transmittance and percent light transmission (total luminous transmittance) were measured as per ASTM D 1003. ASTM D 2244 was used for Macbeth color measurements. The composition of the comparative samples and the polymeric sheets are described in Table 1 and Table 2 respectively below. It is to be noted that compositions are provided only in cases where they were known. For example, the composition for Sample #5, Teijin 9391 that is used as a screen in a liquid crystalline television set (LCD TV) is not known and is therefore not provided below.

The polymeric sheets were made in four colors white, blue, red and green. Each polymeric sheet represented by (Samples #6-13) contained a first polymeric layer and a second foamed layer. The second foamed layer contained a syntactic foam that comprised polycarbonate and TOSPEARL®.

The Examples of this disclosure (Sample #s 6-13) were coextruded. The respective compositions for the first polymeric layer and the second foamed layer are shown in the Table 2. The second foam layer was extruded through a main extruder having a single screw and a screw diameter of 8 inches. The barrel temperatures from the throat to the die around the main extruder were 410, 440, 480, 510, 527, 537 and 450° F. respectively. The main screw was rotated at 42 revolutions per minute.

The first polymeric layer was extruded through a co-extruder screw. The barrel temperatures from the throat to the die around the co-extruder screw were 420, 440, 465, 480, 480, 480 and 450° F. respectively. The co-extruder screw was rotated at 48 revolutions per minute.

The first polymeric layer and the second foamed layer emanating from the respective extruders were then passes through a die having 9 zones (barrels) that were set at temperatures of 554, 558, 545, 527, 537, 550, 580 and 574° F. respectively.

The extrudate emanating from the die was subjected to lamination in a 3 roll mill with the three rolls (roll #1, roll #2 and roll #3) being operated at temperatures of 195° F., 210° F. and 270° F. respectively. The roll mill is a polishing mill stack and is capable of texturing one or both surface of the polymeric sheet. The polymeric sheet was not textured for these examples. Some of the compositions that were tested along with the sheet thicknesses are shown in the Table 1. The remaining compositions are shown in the Table 2.

TABLE 1

| Sample # | Sample Name | Composition | Thickness (micrometers) | Commercially Available from |
| --- | --- | --- | --- | --- |
| 1* | SG308OB | 90 wt % polycarbonate 10 wt % concentrate** | 2,997 | Made at Sabic Innovative Plastics |
| 2* | SG410 | 94 wt % polycarbonate 6 wt % Titanium dioxide | 2,464 | Made at Sabic Innovative Plastics |
| 3* | Sungard White | — | 5,385 | Commercially available from Plaskolite |

TABLE 1-continued

| Sample # | Sample Name | Composition | Thickness (micrometers) | Commercially Available from |
|---|---|---|---|---|
| 4* | TUFFAK XL white | — | 2,895 | Commercially available from Atofina |
| 5* | Teijin 9391 LCD TV | — | 2,000 | Commercially available from Teijin |
| 6 | ML9103 White | See Table 2 | 3,734 | Made at Sabic Innovative Plastics |
| 7 | ML9103 White | See Table 2 | 3,048 | Made at Sabic Innovative Plastics |
| 8 | ML9103 White | See Table 2 | 3,784 | Made at Sabic Innovative Plastics |
| 9 | ML9103 Blue | See Table 2 | 3,759 | Made at Sabic Innovative Plastics |
| 10 | ML9103 Blue | See Table 2 | 3,911 | Made at Sabic Innovative Plastics |
| 11 | ML9103 Green | See Table 2 | 3,734 | Made at Sabic Innovative Plastics |
| 12 | ML9103 Red | See Table 2 | 3,759 | Made at Sabic Innovative Plastics |
| 13 | ML9103 Red | See Table 2 | 2,971 | Made at Sabic Innovative Plastics |

*= comparative samples
**Concentrate formulation 5.66% TOSPEARL 120, 0.05% Optical Brightener EASTOBRITE OB1, 0.09% IRGAPHOS 168, 0.05% CYASORB 5411 (UV abs)

TABLE 2

| | Sample # | | | | | | | |
|---|---|---|---|---|---|---|---|---|
| | 6 | 7 | 8 | 9 | 10 | 11 | 12 | 13 |
| Color Composition | White | White | White | Blue | Blue | Green | Red | Red |
| First polymeric layer thickness (micrometers) | 251 | 1062 | 226 | 1667 | 505 | 1204 | 0.508 | 1347 |
| Polycarbonate resin (wt %) | 99 | 98.5 | 99 | 99 | 99 | 99 | 99 | 99 |
| Pigment (wt %) | Less than 1 wt % | 1.5 | Less than 1 wt % | Less than 1 wt % | Less than 1 wt % | Less than 1 wt % | Less than 1 wt % | Less than 1 wt % |
| Second foamed layer thickness (micrometers) | 3480 | 1986 | 3558 | 2092 | 3407 | 2530 | 3758 | 1623 |
| Polycarbonate resin (wt %) | 99.65 | 99.50 | 99.53 | 99.52 | 99.58 | 99.84 | 99.78 | 99.42 |
| TOSPEARL (wt %) | 0.35 | 0.50 | 0.47 | 0.48 | 0.42 | 0.26 | 0.32 | 0.58 |

Figure 4:
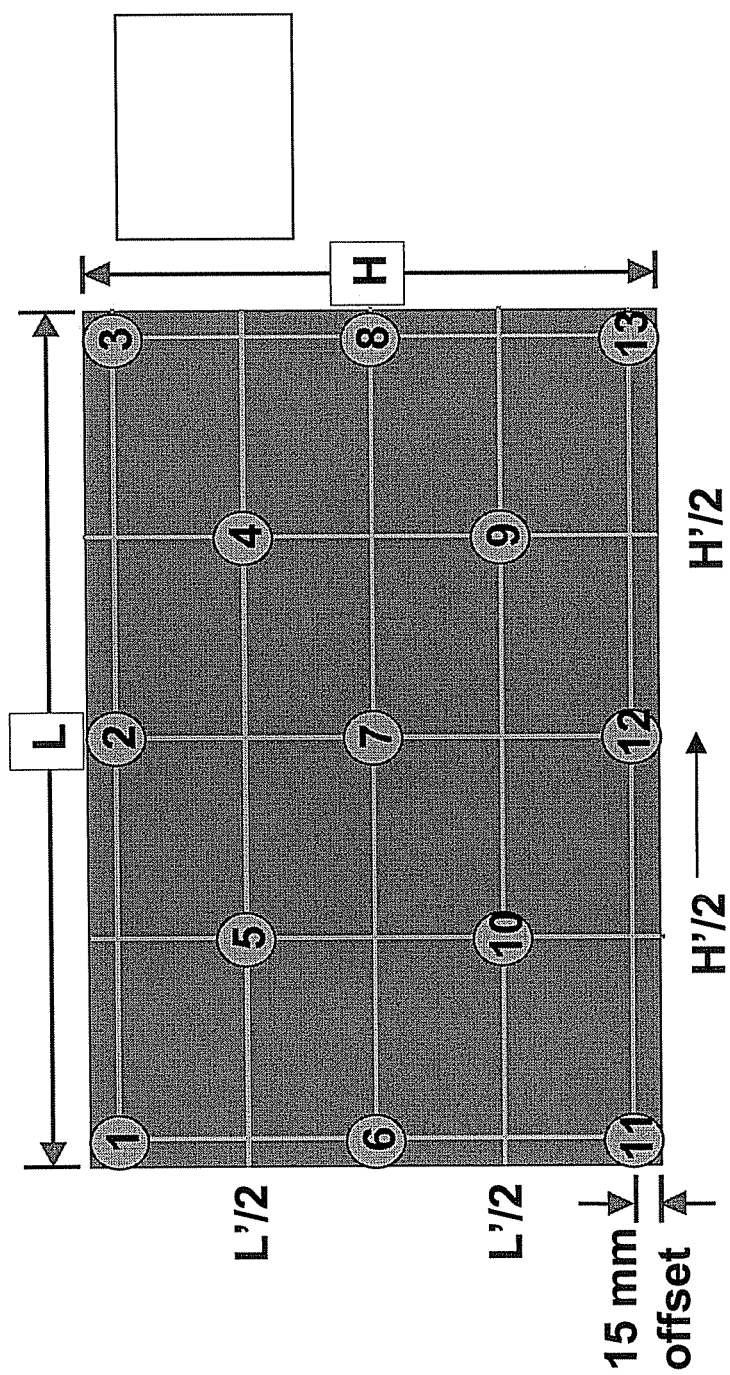
FIG. 4 is an exemplary depiction of the experimental set-up for the 13 point light uniformity test.

All of the samples from the Table 1 were subjected to a 13 point light uniformity test which is described as follows. The luminance distribution is generally measured using a 13-point grid set out along the film as shown in the FIG. 1. The 13 points in the grid are defined by the Video Electronics Standards Association (VESA). The term "point" refers to a "location" of the source of light in the light box. The points are equally spaced. As can be seen in the FIG. 4, the film has 13 locations on its surface at which the luminance is measured. The source of light at each of the 13 locations was a cold cathode fluorescent light (CCFL). The average distance between lamps (light sources) in the 13 point light box was 20.8 millimeters. The distance between the upper source of the light source and the surface of the polymeric sheet that is first illuminated by the lamps is 12.8 millimeters. Each lamp was surrounded by a reflector that reflects light from the light source towards the polymeric sheet. The distance between the base of the reflector to the surface of the polymeric sheet that is first illuminated by the lamps is 16.4 millimeters.

Parameters measured were the 13 point uniformity, the luminance (in candelas per square meter), percent luminance as compared with the luminance of the polymeric sheet used in Teijin 9391, which is used as a television screen in a liquid crystalline display format. The other measured parameter is percent transmittance Illumination C. The results are shown below in the Table 3.

TABLE 3

| Sample # | Sample Name | 13 point uniformity (VESA) | Luminance Cd/m² | Percent luminance | % LT Illumination C (ASTM D 2244) |
|---|---|---|---|---|---|
| 1* | SG308OB* | 71.54 | 2387.7 | 73.34 | 44.79 |
| 2* | SG410* | 73.9 | 1888.6 | 58.02 | 24.23 |
| 3* | Sungard White* | 59.6 | 3432.14 | 105.44 | 57.49 |
| 4* | TUFFAK XL white* | 73.86 | 1776.55 | 54.58 | 32.23 |
| 5* | Teijin 9391 (LCD TV)* | 94.07 | 3254.9 | 100 | 61.8 |
| 6 | White | 96.06 | 2268.5 | 69.7 | 32.22 |
| 7 | White | 94.66 | 2066.9 | 63.5 | 37.06 |
| 8 | White | 91.62 | 1830.5 | 56.2 | 20.75 |
| 9 | Blue | 86.31 | 593.6 | 18.2 | 13.29 |
| 10 | Blue | 84.07 | 662.1 | 20.3 | 36.37 |
| 11 | Green | 92.54 | 1911.5 | 58.7 | 15.93 |
| 12 | Red | 88.70 | 180.6 | 5.5 | 4.97 |
| 13 | Red | 87.05 | 219.4 | 6.7 | 4.92 |

*comparative examples

As can be seen in the Table, the Sample #s 6-8 that are colored white, displays a percent luminance transmission that is comparable with the comparative samples SG410 and TUFFAK XL white. Similarly, Sample #10 that is colored blue displays a percent luminance transmission that is comparable with the comparative samples SG410 and Tuffak XL white.

The 13 point uniformity test conducted on the respective samples show results that are comparable with the Teijin 9391 that is used as a screen in a liquid crystalline television set (LCD TV).

The polymeric sheet of the present disclosure provides a number of advantages over other comparative screens and sheets that are used in commercial signs. The ability to disperse light uniformly permits the used of LEDs as sources of illumination. The use of LEDs permits lower energy consumption and therefore an efficient utility of light. The polymeric sheet optimizes the uniformity of color. This ability to optimize the uniformity of color permits minimizing the number of LED sources, based on nearest neighbor LED spacing and the distance between the LED source and the polymeric sheet. The polymeric sheet also minimizes the appearance of the color difference between the lit and unlit states for the sign or display.

Because of the use of a foam for diffusing the light, the polymeric sheet is up to about 5 wt % lighter, specifically up to about 10 wt %, and more specifically up to about 20 wt % lighter than a comparative polymeric sheet that is used for displaying illuminated signs and that does not contain the foam.

The light weight of the polymeric sheet permits is used aerospace and transportation applications for displaying bright colors. For example, it can easily be carried on the sides of locomotives, ships, vehicles such as buses, trucks, automobiles, and the like.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A polymeric sheet comprising:
a first polymeric layer; wherein the first polymeric layer comprises a first additive composition that allows for a light transmission of greater than or equal to about 75%; the first additive composition comprising an additive; the additive being a light scattering additive, an optical brightener, or a combination comprising at least one of the foregoing additives; and
a second foamed layer; the first polymeric layer being in operative communication with the second foamed layer; the polymeric sheet having a percent light transmission as measured according to ASTM D 1003 of about 3% to about 80% at a thickness of greater than or equal to about 1,000 micrometers,
wherein the light transmission of the polymeric sheet is uniform across the polymeric sheet, the polymeric sheet having a variation in luminance transmission as measured in a 13 point uniformity test that is less than or equal to about 5% across the polymeric sheet and the polymeric sheet having a surface area of greater than or equal to about 10000 square centimeters.

2. The polymeric sheet of claim 1, further comprising a third polymeric layer and/or a fourth polymeric layer.

3. The polymeric sheet of claim 1, further comprising an additional foamed layer disposed on a surface of the first polymeric layer that is opposed to a surface in contact with the second foamed layer.

4. The polymeric sheet of claim 1, wherein the first polymeric layer has a thickness of greater than or equal to about 0.01 micrometers.

5. The polymeric sheet of claim 1, wherein the second foamed layer comprises a polymer, an aerogel, or a combination comprising a polymer and an aerogel.

6. The polymeric sheet of claim 1, wherein the second foamed layer comprises a foam that has a cell size of about 10 nanometers to about 1 millimeter; the foam having a density of about 0.001 to about 1.1 grams per cubic centimeter.

7. The polymeric sheet of claim 1, wherein the second foamed layer comprises a foam that has a cell size of about 0.1 micrometers to about 100 micrometers.

8. The polymeric sheet of claim 1, wherein the second foamed layer comprises a foam that has a porosity of porosity of about 70 volume percent to about 99.8 volume percent, based on the total volume of the foam.

9. The polymeric sheet of claim 1, where the second foamed layer has a thickness of about 1,000 to about 8,500 micrometers.

10. The polymeric sheet of claim 1, wherein the polymeric sheet comprises an ultraviolet absorbing agent and/or a pigment.

11. The polymeric sheet of claim 1, wherein the first polymeric layer is disposed upon the second foamed layer and is in intimate contact with it.

12. The polymeric sheet of claim 1, further comprising an ultraviolet resistant coating.

13. An article comprising the polymeric sheet of claim 1.

* * * * *